Aug. 25, 1959    J. V. RICH    2,900,821
FORCED DRAFT INSTRUMENT SHELTER
Filed Dec. 10, 1956
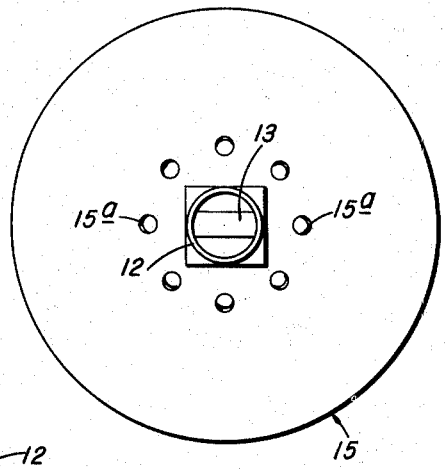
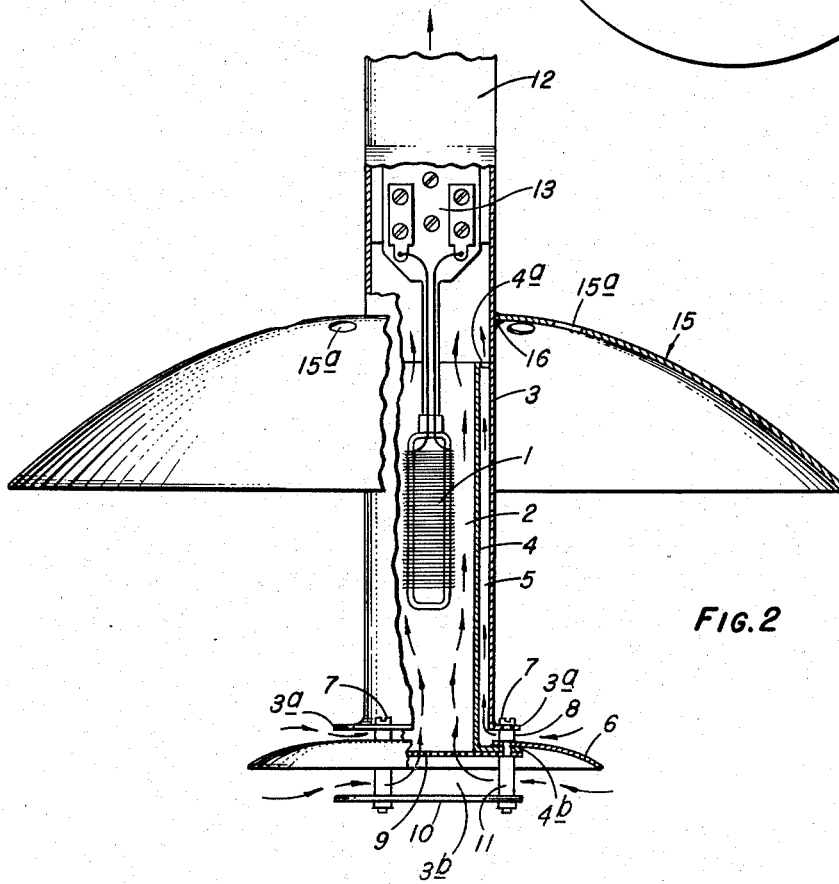
INVENTOR
J. V. Rich
BY
ATTORNEY United States Patent Office 2,900,821
Patented Aug. 25, 1959

2,900,821
FORCED DRAFT INSTRUMENT SHELTER

Jack V. Rich, Agoura, Calif., assignor to Bendix Aviation Corporation, North Hollywood, Calif., a corporation of Delaware Application December 10, 1956, Serial No. 627,437

7 Claims. (Cl. 73—349)

This invention relates to shelters for temperature-responsive instruments.

One of the chief functions of such shelters is to shield instruments from radiation effects so that their readings give more accurate indications of a condition, such as the temperature, of the ambient fluid.

An object of the invention is to provide a shelter structure that is unusually effective in shielding an instrument from radiation effects.

Another object is to provide such a shelter that is compact, simple and inexpensive.

Other more specific objects and features of the invention will appear from the following detailed description of an application of the invention to a shelter for a meteorological temperature sensing element.

In the drawing:

Fig. 1 is a plan view of an embodiment of the invention.

Fig. 2 is a side elevational view, with portions shown in section.

In the drawing there is shown a temperature sensing resistor 1 located in a central space 2 defined by a shelter, the essential elements of which include: an outer, vertical, open-ended fluid conducting member 3; and an inner, vertical, open-ended fluid conducting member 4 of smaller lateral dimensions than the outer member and positioned there within and defining, with the juxtaposed portion of the outer member, a fluid passage 5 surrounding the central space 2. The upper end of the inner member 4 may have outwardly extending fingers 4a to contact the outer member 3 and center the upper end of the inner member with respect thereto. The lower ends of the outer member 3 and of the inner member 4 have out-turned, spaced, vertically juxtaposed flanges 3a and 4b respectively, which are joined by screws 7 and spacer sleeves 8. The screws 7 extend through a screen 9 covering the lower end of the inner member 4 and through a spaced baffle 10 therebelow, spacing sleeves 11 being provided between the screen 9 and the baffle 10 to maintain them in proper position. Also secured to the flange 4b by the screws 7 is a skirt 6 which extends laterally from the flange 4b.

In use, the device is supported by a conduit 12 secured to the upper end of the outer member 3 and connected to a suction pump or fan which continually exhausts air from the upper end of the member 3. The electrical leads from the resistor 1 may be also extended from a connector block 13 through the conduit 12 to the mounting. The block 13 does not close the member 3.

A large, umbrella-like, outwardly and downwardly depending skirt 15 may be provided on the outer member 3, as by welding indicated at 16. The function of the shield 15 is to reflect direct solar radiation and prevent it from impinging on the portion of the outer member 3 juxtaposed to the resistor 1. Apertures 15a may be provided in the skirt 15 near the inner edge thereof.

In operation, the suction applied through the conduit 12 to the upper end of the outer member 3 creates a continuous draft of air inwardly through the apertures 3b, inwardly between the shield 10 and the skirt 6; and through the screen 9 into and upwardly through the inner member 4. It also creates a continuous draft inwardly above the skirt 6 into the space 5, through that space, and out the upper end thereof past the spacing fingers 4a into the member 3.

The chief novelty of the present invention is the provision of the shielding skirt 6 which separates the air intake to the space 5 from the air intake to the lower end of the inner member 4. Although the reason for it has not been definitely ascertained, this feature appreciably reduces the effect of radiation to and from the outer member 3 and causes the sensor 1 to more accurately indicate the true temperature of the ambient fluid that is drawn into and through the shelter. It also appears that the holes 15a increase the efficiency by permitting escape of warm air below the skirt 15 so that it is not drawn into the space 5.

The shield 10 has the primary function of preventing direct radiation from below into the lower end of the inner member 4 and onto the sensing element 1. The skirt 6, in addition to its function of separating the air intake into the space 5 from the air intake into the lower end of the inner member 4, serves to intercept radiation from the sides and downwardly onto the shield 10. By reducing the radiation effect to and from the shield 10, its temperature more closely approximates that of the entering air and does not tend to introduce any change in the temperature of the air moving to the sensing element 1.

Although for the purpose of explaining the invention, a particular embodiment thereof has been shown and described, obvious modifications will occur to a person skilled in the art, and I do not desire to be limited to the exact details shown and described.

I claim:

1. A shelter of the induced draft type for a temperature sensitive meterological instrument, said shelter comprising: an outer, vertical, open-ended fluid conducting member adapted to be connected at its upper end to a suction conduit for inducing a flow of fluid upwardly therethrough; an inner, vertical, open-ended fluid conducting member of smaller lateral dimensions than said outer member and positioned therewithin, said inner member defining a central space for an instrument, and defining with the juxtaposed portion of the outer member a fluid passage surrounding said central space, the lower end of said inner member extending below the lower end of said outer member; and a skirt on the lower end of said inner member, said skirt extending laterally below said outer member and defining with the lower end of the outer member a lateral passage for the entry of ambient fluid into the lower end of said fluid passage.

2. Apparatus according to claim 1 in which said skirt extends laterally substantially beyond said outer member.

3. Apparatus according to claim 2 in which said skirt extends laterally and downwardly.

4. Apparatus according to claim 1 including a baffle juxtaposed to the lower end of said inner member in spaced relation therebelow for blocking radiation into said central space through the lower open end of said inner member while permitting fluid entry thereinto.

5. Apparatus according to claim 4 in which said skirt extends laterally substantially beyond said baffle.

6. Apparatus according to claim 1 including an upper skirt of substantially larger diameter than said first-mentioned skirt extending outwardly and downwardly from said outer member at a point thereon above the level of said central space.

7. Apparatus according to claim 6 in which said upper skirt has a fluid outlet aperture therein adjacent to said outer member.

References Cited in the file of this patent

FOREIGN PATENTS

| 967 | Great Britain | Nov. 17, 1904 |
| 864,964 | France | Feb. 10, 1941 |